June 5, 1934.   P. E. EDELMAN   1,961,746
AUTOMATIC VOLTAGE REGULATOR SYSTEM
Original Filed April 19, 1928
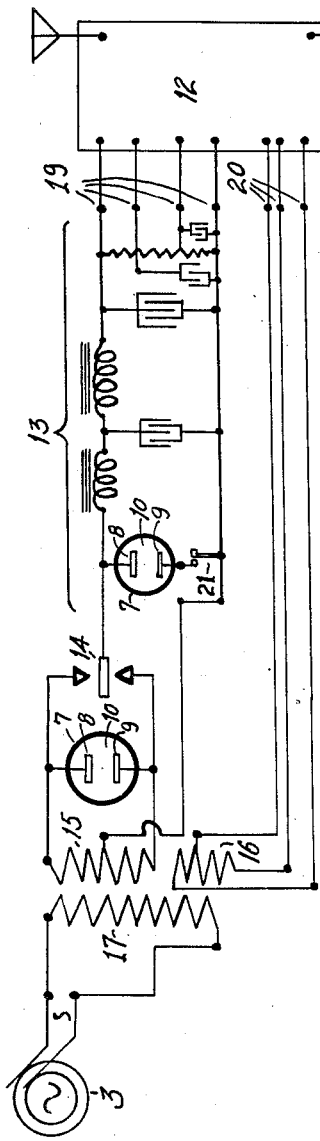
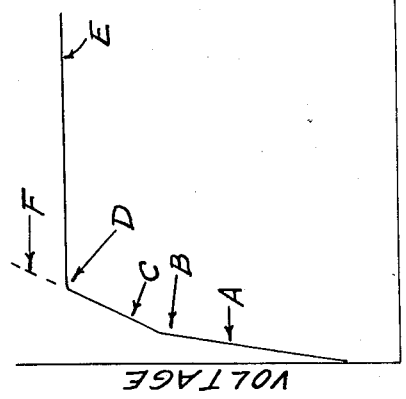
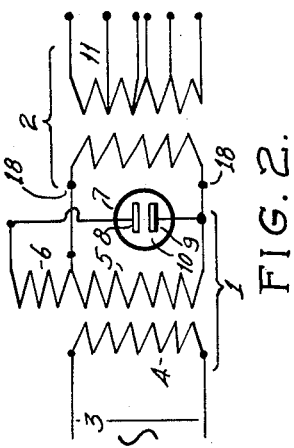
INVENTOR.
Philip E. Edelman.

Patented June 5, 1934

1,961,746

UNITED STATES PATENT OFFICE 1,961,746

AUTOMATIC VOLTAGE REGULATOR SYSTEM

Philip E. Edelman, Chicago, Ill., assignor, by mesne assignments, to Robert T. Mack, trustee, Chicago, Ill.

Application April 19, 1928, Serial No. 271,265
Renewed September 15, 1933

4 Claims. (Cl. 171—119)

My present invention relates to a method of and apparatus for maintaining a substantially constant source of potential from a varying supply and has for its object to hold voltage from a variable supply to close limits in simple inexpensive and efficient manner. My invention is applicable to any source of current, alternating or direct, which tends to vary in voltage, and is suitable for use in operating a wide variety of load apparatus in which a constant voltage is necessary or desirable. Various changes and modifications may be made according to my idea and within the scope of the appended claims.

My invention will be understood by reference to the accompanying drawing in which an exemplification of a suitable embodiment thereof is shown by diagrams; Figure 1, illustrating a complete application of the invention to a radio power supply; Figure 2, an embodiment of the regulator suitable for attachment to alternating current devices; and Figure 3 a graphical representation of the peculiar characteristic of the new electrolytic cell described herein.

Constant voltage is desirable for many purposes and the need therefor is exemplified by the requirements of a radio set employing alternating current type tubes.

In Figure 1, a source of alternating current, 3, supplies a transformer primary winding, 17. The secondary winding, 16 thereof supplies filament current to a radio set, 12, at terminals, 20. The middle tapped winding 15 thereof feeds a filter rectifier circuit, 13.

Thus rectifier 14 is connected to winding 15, in customary manner, and supplies current to filter element 13 so that a plurality of output potential taps 19 are connected to the tapped resistance 19a at a plurality of points so as to provide different direct current potentials, these taps being connected to the radio set 12 as shown. The condensers shown are connected in this filter circuit in a well-known manner.

The above circuit is characterized by the addition of my improvement either ahead of or after rectifier 14. Either one or both of two similar electrolytic cells 7 are shunt connected to said rectifier 14 as shown, a switch 21 indicating that the second cell 7 controlled thereby may be omitted, if desired.

I will first describe the cell 7 which is connected to winding 15. It consists of a container filled with an electrolyte material 10 and provided with a pair of electrodes 8, 9. These electrodes 8, 9 may be of aluminum prepared with a dielectric coating such as electrolyte material 10 which may be prepared by dissolving hepta-ammonium molybdate crystals in pure hot glycerine, to form a brown colored solution in said glycerine, suitable proportions being ¼ ounce of the crystals to 8 pounds of the glycerine. The cell 7 controlled by switch 21 may be similarly prepared, as is the case also for the cell 7 indicated in Figure 2.

Reference is made to the textbook "General Chemistry for Colleges" by Alexander Smith, New York, The Century Co. 1919, page 413, defining glycerine as an alcohol, and pages 245, 246, 247 and 261 defining the aforesaid molybdate crystals in the class of ionogens.

The manner of preparation and use of the cell 7 differs from that of the aforesaid copending application in that a different characteristic of said cell 7 is utilized. This will be understood from the curve, Figure 3 hereafter described.

In Figure 2, the cell 7 is combined with a transformer 4, 5, 6 to make a regulating unit, 1, attachable to any source of current supply 3 and any load device 2. Primary winding 4 transfers energy to windings 5 and 6. It is desired to maintain the input voltage to load device 2 constant at terminals 18 to control output 11 of device or transformer 2. Terminals 18, 18 are supplied with energy by winding 5. Cell 7 is supplied with higher potential by the joint action of windings 5 and 6.

Whereas cell 7 regulates the alternating current input voltage to terminals 18, 18 in Figure 2 or to rectifier 14 in Figure 1, it may also be used by closing switch 21 in Figure 1 to control the potential output of rectifier 14. The cell 7 connected to winding 15 in Figure 1 also tends to regulate the potential of winding 16 because both windings 16 and 15 are coupled to winding 17. It is desirable to design the windings 17, 15, 16 or the windings 4, 5, 6 respectively to take advantage of transformer characteristics favorable to the control action. That is to say, it is desirable to proportion said windings and the resistance thereof to obtain cooperative regulation in manner well known in the art, whereby the current taken from supply 3 is limited, thus making an input available for cell 7 which is limited in total volt-amperes so that if the voltage rises the current absorption ability of cell 7 becomes effective in causing a similar reduction of the available potential. I make no claim to this characteristic of transformers other than in the combination with the cell 7, and it will be understood that the unit represented by the figure "1" in drawing illustration of Figure 2 affords an automatic regulator by the combination shown.

Referring now to Figure 3 and to my aforesaid copending patent application, the principle of operation will be understood. If two aluminum electrodes are inserted in a polarizing electrolyte containing ammonium molybdate they can be formed with a dielectric coating, on either direct or alternating current, and when so formed will be permanently operable, polarized both ways when used on alternating current. If the voltage across such a cell is measured while the voltage supplied thereto is increased by increments to maintain current thru the cell 7, a curve such as in Figure 3 can be plotted from the readings of cell voltage with respect to (cell current) times (operating time). A certain minimum starting current is required for current flow and a certain minimum starting voltage is necessary therefor, but for a given fixed voltage the current flow rapidly diminishes to negligible value. This is shown by curve portion "A". In order to maintain current flow for increasing voltage, a further increase in voltage is required.

This is indicated by curve portion "C" above bend "B". By further increasing the voltage applied to the cell 7, a limit bend "D" will be reached after which further attempt to increase the voltage as indicated by dotted line "F" is defeated by the peculiar property of this cell to maintain the curve on the flat portion "E". The increase voltage above bend "D" if applied from a source of voltage which drops in potential on increasing load, thus tends to reach a fixed value along curve portion "E" with time, and the cell 7 merely dissipates the excess energy applied for all applied values of energy at higher voltage than limited by the value allowed by E. The characteristic represented by "D—E" is much higher in value for the cell 7 than can be usefully employed for rectification or capacitative purposes. Usually such a cell 7 will be operated for normal rectifying or capacitative purposes near the top portion of curve A before the sparking bend B, and never on the portion C near limiting bend D. But for the present purposes, it is desirable to work near bend D to take advantage of characteristic set forth. The new use of cell 7 as a voltage regulating element is thus different from its other characteristic properties and the combination set forth, with the input voltage supply derived thru a limiting winding, having a falling characteristic for increase in load taken therefrom, constitutes a surprising, effective, efficient, and economical voltage regulator.

It is desirable to proportion the regulator for an adjustment to hold the voltage at the terminals of cell 7 at some value lower than the normal mean value of the voltage applied thereto when no variation occurs in source 3, as cell 7 functions mainly on an increase in applied voltage rather than on a decrease. For example if 110 volts is desired at terminals 18, 18 of Figure 2, winding 5 should normally deliver more than 110 volts thereto, so that winding 6 can be used to operate cell 7 near its characteristic limit "D—E". A certain amount of regulation might be had at bend "B" but would be insufficient for most practical purposes. Even with wide changes in voltage of source 3, the aforesaid regulator is effective for automatic regulation of the portion thereof which is used.

In Figure 1, it is evident that with constant applied potential to rectifier 14 it may still be desirable to further regulate the output potential from rectifier 14 and this can be done by closing switch 21. Then any variations in output from rectifier 14 are effective in dissipating energy in cell 7 connected by switch 21 thereto, so that in supplying the additional temporary load required by the regulating characteristic of cell 7, last described, the rectifier 14 increases its energy losses sufficient to drop the voltage output thereof to the value adjusted for. It is thus necessary to predetermine some fixed voltage value below the minimum voltage obtainable from the supply source via the connected transformer 17, 15, 16 or 4, 5, for effective regulation. If desired, winding 6 may be tapped to secure initial fixed setting for the voltage applied to cell 7. In Figure 1, the cell 7 connected ahead of rectifier 14 does not interfere with its proper normal action because the electrodes 8 and 9 thereof operating in electrolyte material 10 are polarized for the voltage adjusted to, in both directions of current flow.

While I have illustrated a typical example of the use of my regulator, I am aware that it can be applied to regulate the voltage required for any of the known current consuming appliances or circuits to which it is suited. I claim:

1. An alternating current regulator comprising a transformer having a tapped secondary to afford two outputs, one for a work circuit and the other for a regulating circuit, and a voltage stabilizing means connected in said regulating circuit to shift the relative amounts of said outputs for substantially constant voltage output to said work circuit.

2. An alternating current regulator comprising a transformer having a work circuit secondary to afford a working voltage output and an auxiliary secondary winding to afford a higher regulating voltage output, and a voltage stabilizing means connected in shunt to said higher voltage output to stabilize the voltage to said work circuit secondary.

3. A voltage regulator comprising a transformer having a divided secondary winding, a load circuit connected to a portion of said winding, and a voltage stabilizing means shunted across all of said secondary winding to operate at a higher voltage than said load circuit portion.

4. An alternating current system arranged for voltage regulation comprising a first transformer connected to a second transformer, the second transformer having a load circuit output, the first transformer having an auxiliary regulating winding, and a voltage stabilizing means connected to said auxiliary winding to operate at a different voltage than that which operates said second transformer.

PHILIP E. EDELMAN.